United States Patent
Usui

(10) Patent No.: US 6,824,173 B2
(45) Date of Patent: Nov. 30, 2004

(54) HIGH-PRESSURE METAL PINE HAVING CONNECTING HEAD AND METHOD OF FORMING THE CONNECTING HEAD AS WELL AS SLEEVE WASHER FOR THE CONNECTING HEAD

(75) Inventor: Shoichiro Usui, Sendai (JP)

(73) Assignee: Usui Kokusai Sangyo Kaisha Limited (JP)

( * ) Notice: Subject to any disclaimer, the term of this patent is extended or adjusted under 35 U.S.C. 154(b) by 0 days.

(21) Appl. No.: 09/731,170

(22) Filed: Dec. 6, 2000

(65) Prior Publication Data

US 2001/0003398 A1 Jun. 14, 2001

(30) Foreign Application Priority Data

Dec. 10, 1999 (JP) .............................................. 11-351888

(51) Int. Cl.[7] ................................................. F16L 19/00
(52) U.S. Cl. ..................... 285/353; 285/334.1; 285/384; 285/385
(58) Field of Search ................................. 285/353, 384, 285/385, 334.1

(56) References Cited

U.S. PATENT DOCUMENTS

| 193,993 | A | * | 8/1877 | Pennie | ................... 285/148.11 |
| 1,862,833 | A | * | 6/1932 | Stover | ......................... 285/249 |
| 1,982,533 | A | * | 11/1934 | Parker | ......................... 285/248 |
| 2,517,669 | A | * | 8/1950 | Hufferd et al. | ............... 285/84 |
| 3,025,086 | A | * | 3/1962 | Mosely | ....................... 285/250 |
| 3,191,971 | A | * | 6/1965 | Somers | ......................... 285/55 |
| 3,649,053 | A | * | 3/1972 | Synder | ....................... 285/110 |
| 3,698,745 | A | * | 10/1972 | Mundt | ......................... 285/256 |
| 4,029,345 | A | * | 6/1977 | Romanelli | ............... 285/334.2 |
| RE29,376 | E | * | 8/1977 | Hiszpanski | .............. 285/148.9 |
| 4,134,430 | A | * | 1/1979 | Mukasa et al. | ............. 138/109 |
| 4,135,741 | A | * | 1/1979 | Albertsen | ..................... 285/55 |
| 4,266,577 | A | * | 5/1981 | Usui | ........................... 138/109 |
| 4,469,356 | A | * | 9/1984 | Duret et al. | ................. 285/332 |
| 4,602,796 | A | * | 7/1986 | Setterberg | .................... 277/236 |
| 4,665,876 | A | * | 5/1987 | Hashimoto | ................... 123/468 |
| 4,784,311 | A | * | 11/1988 | Sugao | ........................ 228/131 |
| 4,864,711 | A | * | 9/1989 | Yokota | ......................... 29/458 |
| 4,900,180 | A | * | 2/1990 | Takikawa | .................... 403/233 |
| 5,058,935 | A | * | 10/1991 | Eidsmore | ..................... 285/330 |
| 5,109,888 | A | * | 5/1992 | Usui | ........................... 138/109 |
| 5,120,084 | A | * | 6/1992 | Hashimoto | ................... 285/156 |
| 5,143,410 | A | * | 9/1992 | Takikawa | .................... 285/197 |
| 5,145,219 | A | * | 9/1992 | Babuder | ...................... 285/330 |
| 5,169,182 | A | * | 12/1992 | Hashimoto | ............... 285/332.2 |
| 5,340,161 | A | * | 8/1994 | Bagnulo | ....................... 285/50 |
| 5,402,829 | A | * | 4/1995 | Takikawa et al. | ............ 138/109 |

(List continued on next page.)

FOREIGN PATENT DOCUMENTS

GB 659623 A1 * 10/1951

*Primary Examiner*—J J Swann
*Assistant Examiner*—Carlos Lugo
(74) *Attorney, Agent, or Firm*—Gerald E. Hespos; Anthony J. Casella

(57) ABSTRACT

There is provided a high-pressure metal pipe which has a connecting head capable of solving the risk of cavitation erosion in the inside of the connecting head by changing the contour shape of a pocket or notch to be formed in the inside of the connecting head during head working into a contour shape having a shallow depth and a gentle cross section. A reduced-diameter connecting head having an outside circumferential surface which is a seat surface having a truncated conical or spherical shape corresponding to a mating seat is provided at a connecting end portion of a thick-walled steel pipe having a comparatively small diameter. An annular concave groove to be formed in the inside of the connecting head during the formation thereof has a contour shape having a shallow depth and a gentle cross section, and the high-pressure metal pipe has a sleeve washer having a cylindrical portion which covers the outer circumferential surface of the reduced-diameter connecting head.

10 Claims, 5 Drawing Sheets

U.S. PATENT DOCUMENTS

| | | | | |
|---|---|---|---|---|
| 5,409,267 A | * | 4/1995 | Bagnulo | 285/50 |
| 5,423,581 A | * | 6/1995 | Salyers | 285/382 |
| 5,709,413 A | * | 1/1998 | Salyers | 285/219 |
| 5,903,964 A | * | 5/1999 | Uematsu et al. | 29/456 |
| 5,957,507 A | * | 9/1999 | Asada | 285/189 |
| 5,979,945 A | * | 11/1999 | Hitachi et al. | 285/125.1 |
| 6,050,611 A | * | 4/2000 | Asada | 285/133.4 |
| 6,070,618 A | * | 6/2000 | Iwabuchi | 138/143 |
| 6,186,121 B1 | * | 2/2001 | Uematsu et al. | 123/468 |
| 6,367,850 B1 | * | 4/2002 | Thrift et al. | 285/382 |
| 6,408,826 B2 | * | 6/2002 | Asada et al. | 123/468 |
| 6,415,768 B1 | * | 7/2002 | Usui | 123/468 |

* cited by examiner

HIGH-PRESSURE METAL PINE HAVING CONNECTING HEAD AND METHOD OF FORMING THE CONNECTING HEAD AS WELL AS SLEEVE WASHER FOR THE CONNECTING HEAD

BACKGROUND OF THE INVENTION

1. Field of the Invention

The present invention relates to a high-pressure metal pipe having a connecting head and being formed of a thick-walled steel pipe of comparatively small diameter, as in the case of a high-pressure metal pipe used for a high-pressure fuel injection pipe approximately 4–20 mm in diameter and approximately 1–8 mm in wall thickness which is widely used as a fuel supply path in, for example, a diesel combustion engine, and to a method of forming such connecting head as well as a sleeve washer for such connecting head.

2. Description of the Prior Arts

This kind of high-pressure metal pipe having a connecting head as well as a method of forming the connecting head have heretofore been as follows. As shown in FIGS. 6 and 7 by way of example, a truncated conical connecting head 12 has a seat surface 13 made of an outside circumferential surface formed at the end of a thick-walled steel pipe 11, and as shown in FIG. 8 by way of example, a truncated conical connecting head 22 having an abacus-bead-like shape has a seat surface 23 made of an outside circumferential surface formed at the end of a thick-walled steel pipe 21. Each of the truncated conical connecting heads 12 and 22 is formed by buckling under axial pressure which is applied from the outside by a punch member, and at the same time a circumferential wall of each of the connecting heads 12 and 22 is expanded outwardly by buckling under such axial pressure, whereby an annular pocket 15-1 (FIG. 6) or 15-2 (FIG. 8) or an annular notch 15-3 (FIG. 7) which has an annular shape deep and large in cross section is formed around an inner circumferential surface of the connecting head 12 or 22. The high-pressure metal pipe is at present in use in the above-described state. Incidentally, reference numerals 14-1, 14-2 and 14-3 denote ring washers or sleeve washers which are respectively fitted to the backs of the connecting heads 12 and 22.

However, the high-pressure metal pipe having such a prior art connecting head as well as the method of forming the prior art connecting head have the following problems. One of the problems is that the deep and large annular pocket 15-1 or 15-2 or annular notch 15-3 (FIG. 8) which is formed in the inside of the connecting head allows a cavitation erosion to occur in the vicinity of the portion of the annular pocket 15-1 or 15-2 or the portion of the annular notch 15-3 owing to a high-pressure fluid during the use of the pipe, and the other problem is that there is a possibility that such a pocket or notch portion causes fatigue failure.

SUMMARY OF THE INVENTION

The present invention has been made in view of the above-described problems of the prior art, and aims to provide a high-pressure metal pipe having a connecting head capable of solving the risks of cavitation erosion and fatigue failure in the inside of the connecting head owing to the contour shape of an annular pocket or notch which is formed in the inside of the connecting head during the working thereof, the contour shape of the annular pocket or notch having a shallow depth and a gentle cross section, as well as to a method of forming such a connecting head.

To achieve the above object, according to an aspect of the invention, there is provided a high-pressure metal pipe which includes a connecting head constructed to have a sleeve washer having a preferably cylindrical pipe-shaped portion which covers an outer circumferential surface of the connecting head of reduced diameter, the connecting head of reduced diameter having an outside circumferential surface formed as a truncated cylindrical or truncated spherical seat surface corresponding to a mating seat, and being provided on a connecting end portion of a thick-walled steel pipe having a comparative small diameter, an annular concave groove which occurs in an inside portion of the connecting head during the formation thereof being shallow in depth and gentle in cross section. According to another aspect of the invention, there is provided a method of forming a connecting head for a high-pressure metal pipe which includes the steps of: fitting a sleeve washer having a cylindrical pipe-shaped portion onto a thick-walled steel pipe in the vicinity of a connecting end thereof, the thick-walled steel pipe being cut into a predetermined size in advance and having a comparatively small diameter; retaining the thick-walled steel pipe with a chuck with a head working section being left on a side which is closer to the connected end than is the sleeve washer; and working an outside circumferential surface of an end portion of the thick-walled steel pipe into a seat surface having a truncated conical shape or the truncated spherical shape corresponding to a mating seat, by a coaxial external pressure of a punch member having the shape of a connecting head, thereby forming the high-pressure metal pipe so that a cylindrical pipe-shaped portion the sleeve washer covers an outer circumferential surface of the connecting head which is of a reduced diameter and has in its inside an annular concave groove whose contour shape is shallow in depth and gentle.

The reduced-diameter connecting head which has the seat surface having the truncated conical shape or the truncated spherical shape has a maximum outer diameter exclusive of the sleeve washer, which is larger than the outer diameter of a straight portion of the thick-walled steel pipe by 10–45%, preferably 12.5–30.0%, more preferably 15–20%.

Moreover, the sleeve washer has a pipe portion which covers the outer circumferential surface of the connecting head.

In the present invention, the reduced-diameter connecting head which has the seat surface having the truncated conical shape or the truncated spherical shape is formed to have a maximum outer diameter exclusive of the sleeve washer, which is 10–45% larger than the outer diameter of a straight portion of the thick-walled steel pipe, for the following reason: in the case of less than 10%, the sleeve washer slips and cannot fasten a fastening nut, and during the fastening of the fastening nut, the connecting head is deformed or fractured by shearing, whereas in the case of greater than 45%, the annular concave groove assumes a contour shape having a deep depth and a cross section which abruptly changes, so that a cavitation erosion easily occurs and there is a likelihood that fatigue failure occurs.

Incidentally, the length of the connecting head is not limited to a particular length, and it is suitable to make the length of the connecting head larger in view of shearing force which acts during the fastening of the fastening nut, but an excessive length is not preferable, because a large pocket occurs.

In the present invention, since the connecting head can be reduced in diameter by the use of the sleeve washer which cover the outer circumferential surface of the connecting head, it is possible to reduce the stroke and the external axial pressure of a punch member during the formation of the connecting head, whereby it is possible to reduce the output of a forming apparatus and hence the size thereof and it is possible to change the contour shape of the annular pocket or notch to be formed in the inside of the connecting head into a contour shape having a shallow depth and a gentle cross section. Accordingly, it is possible to solve the risk of cavitation erosion due to fluid pressure in the inside of the connecting head, and moreover, it is possible to reduce the possibility that such a pocket or notch portion causes fatigue failure.

BRIEF DESCRIPTION OF THE DRAWINGS

The invention will become more readily appreciated and understood from the following detailed description of preferred embodiments of the invention when taken in conjunction with the accompanying drawings, in which.

DETAILED DESCRIPTION OF PREFERRED EMBODIMENTS

Figure 1:
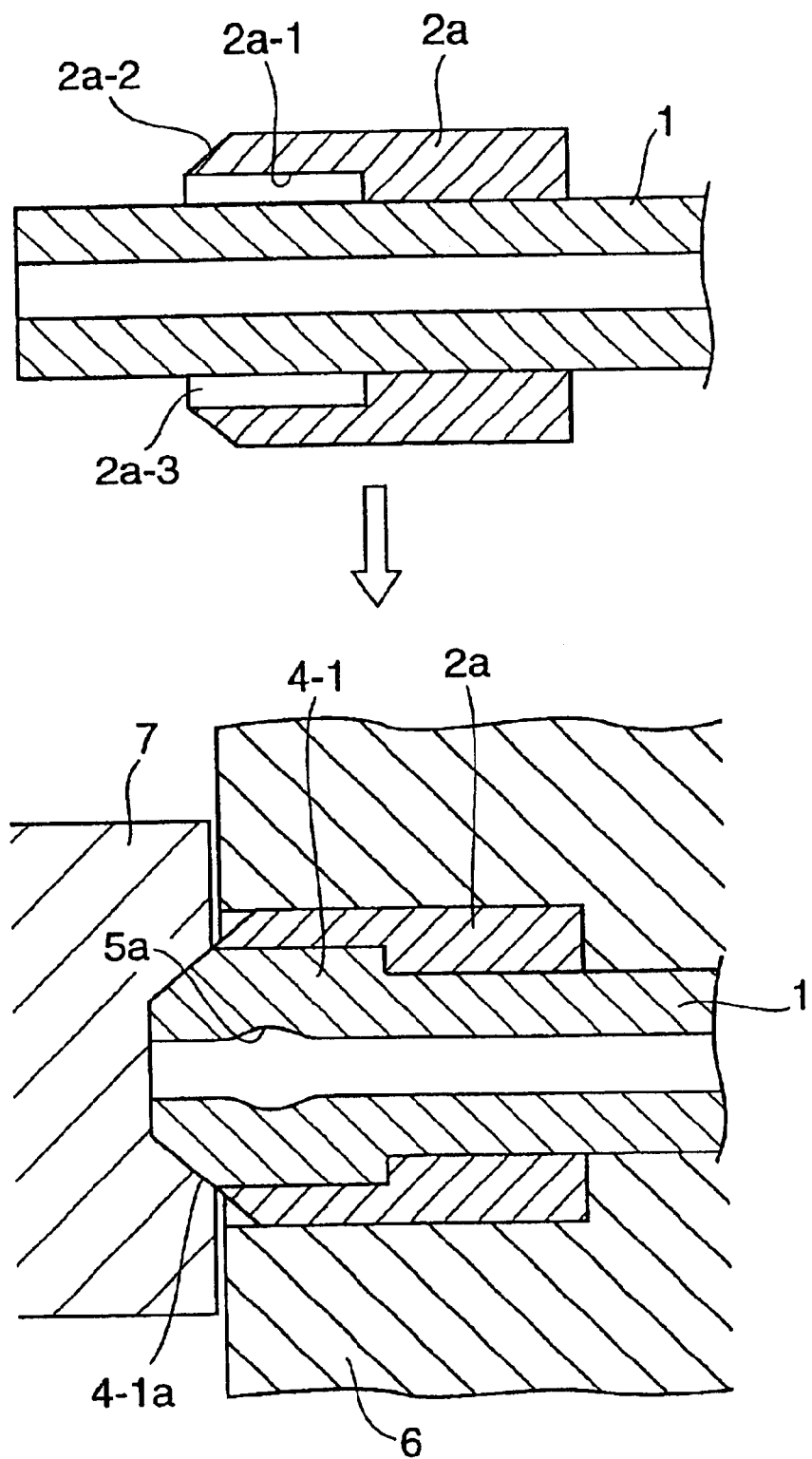
FIG. 1 is an explanatory view, in longitudinal section, showing a high-pressure metal pipe having a connecting head according one embodiment of the present invention, and a working process based on a method of forming such connecting head.

In the present invention, reference numeral 1 denotes a thick-walled steel pipe, reference numerals 2a to 2d sleeve washers, reference numerals 4-1 to 4-4 connecting heads having reduced diameters, reference numerals 5a to 5d annular concave grooves, reference numeral 6 a chuck, and reference numeral 7 a punch member.

The thick-walled steel pipe 1 is formed of a thick-walled pipe made of a carbon steel material which is cut into a predetermined size in advance, and the thick-walled pipe has a comparatively small diameter, for example, a diameter of 4 mm to 20 mm and a wall thickness of 1 mm to 8 mm.

In a method of forming the connecting head of the high-pressure metal pipe shown in FIG. 1 according to the present invention, the sleeve washer 2a having an approximately cylindrical pipe-shaped portion which covers the connecting head is fitted in advance into in the vicinity of the connecting head of the thick-walled steel pipe 1 with a head working section being left. This sleeve washer 2a has an approximately cylindrical enlarged-diameter portion 2a-1 which is formed to extend over approximately a half of the axial length of the sleeve washer 2a on a head-forming side, and an inclined surface 2a-2 which is approximately parallel to a seat surface of truncated conical shape around the outside circumference surface of the enlarged-diameter portion 2a-1 at the head-forming side end opening thereof. Accordingly, when the sleeve washer 2a having this cross-sectional shape is fitted onto the thick-walled steel pipe 1, an annular space 2a-3 is formed between the inner circumferential surface of the approximately cylindrical enlarged-diameter portion 2a-1 and the outer circumferential surface of the thick-walled steel pipe 1, as shown in FIG. 1.

Figure 2:
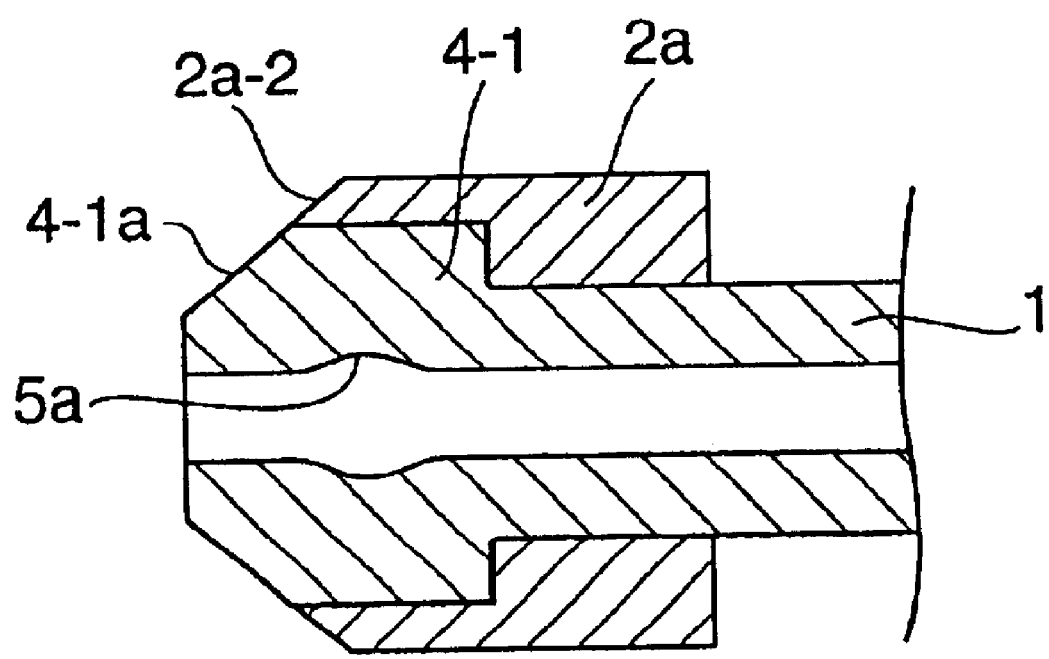
FIG. 2 is a longitudinal sectional view showing one embodiment of the high-pressure metal pipe formed by the connecting-head forming method shown in FIG. 1.

Then, when the end portion of the thick-walled steel pipe 1 is axially pressed by the punch member 7 with the sleeve washer 2a and the thick-walled steel pipe 1 being retained in the above-described state by the chuck 6, a portion of the head-forming section of the thick-walled steel pipe 1 plastically flows into the annular space 2a-3 of the sleeve washer 2a fitted in the thick-walled steel pipe 1 in advance, whereby the reduced-diameter connecting head 4-1 is formed. At the same time, the end portion of the thick-walled steel pipe 1 including this reduced-diameter connecting head 4-1 and the pipe-shaped portion of the sleeve washer 2a are integrated in tight contact with each other, whereby the connecting head shown in FIG. 2 is obtained. The connecting head has the reduced-diameter connecting head 4-1 whose outer circumferential surface is covered with the sleeve washer 2a, preferably, the approximately cylindrical enlarged-diameter portion 2a-1, and has the truncated cylindrical seat surface 4-1a for a mating seat (not shown) at the end portion of the thick-walled steel pipe 1. As described previously, the outermost diameter of the reduced-diameter connecting head 4-1 is larger than the outer diameter of the straight portion of the thick-walled steel pipe 1 by 10–45%, preferably 12.5–30.0%, more preferably 15–20%. Incidentally, the sleeve washer 2a may be worked with additional caulking so that the sleeve washer 2a is far more firmly secured to the thick-walled steel pipe 1.

In this embodiment, since a portion to be worked by buckling during the formation of the connecting head is only the working section for the reduced-diameter connecting head 4-1 except the reduced-diameter portion of the sleeve washer 2a which covers the connecting head, it is possible to make the working section (buckling section) far smaller than it is in the case where the entire connecting head is formed from only the thick-walled steel pipe 1 by the prior art forming method using the large axial pressure and the long stroke of the punch member 7. Accordingly, the annular concave groove 5a which is formed around the inner circumferential surface of the connecting head by the outward expansion of the peripheral wall thereof due to buckling under the pressure of the punch member 7 has a contour shape with a shallow depth and a gentle cross section.

Figure 3:
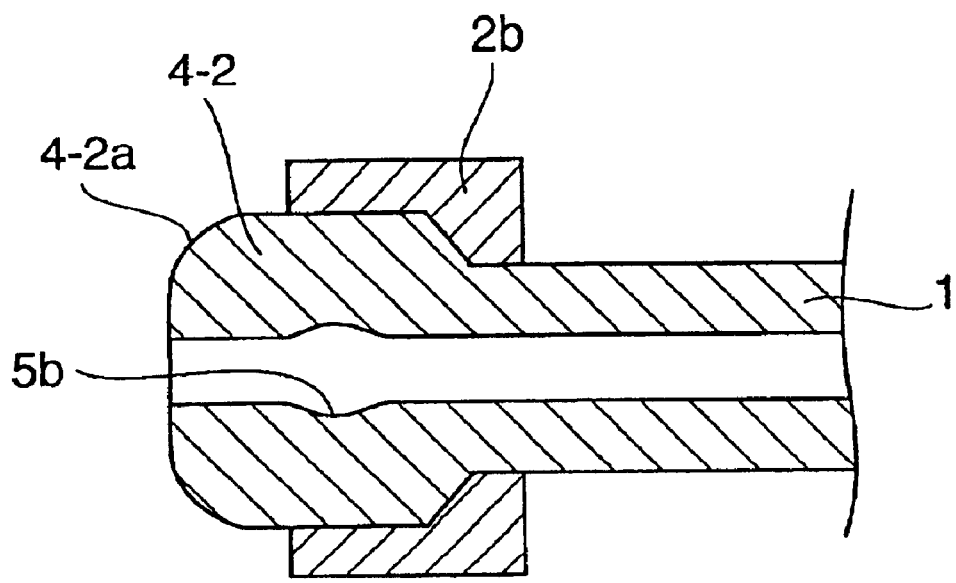
FIG. 3 is a longitudinal sectional view showing another embodiment of the high-pressure metal pipe formed by the method according to the present invention.
Figure 4:
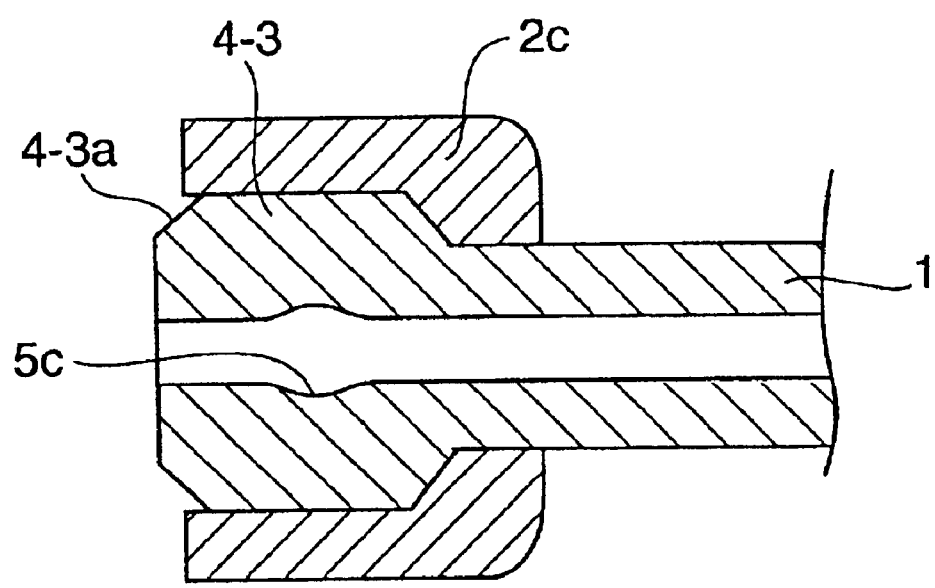
FIG. 4 is a longitudinal sectional view showing another embodiment of the high-pressure metal pipe formed by the method according to the present invention.
Figure 5:
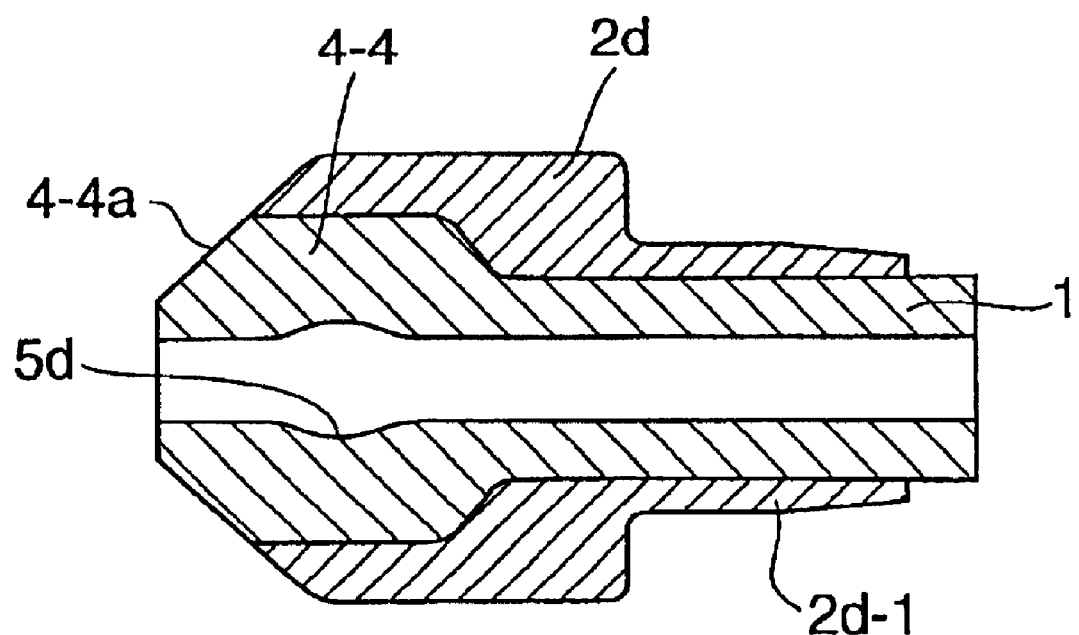
FIG. 5 is a longitudinal sectional view showing another embodiment of the high-pressure metal pipe formed by the method according to the present invention.
Figure 6:
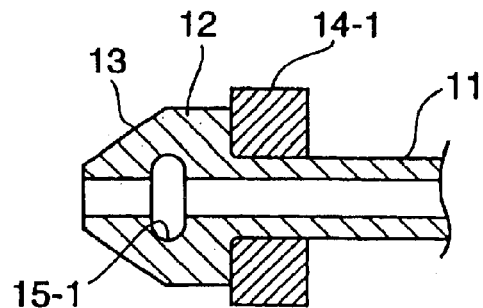
FIG. 6 is a longitudinal sectional view showing one example of a connecting head formed by a prior art forming method.
Figure 7:
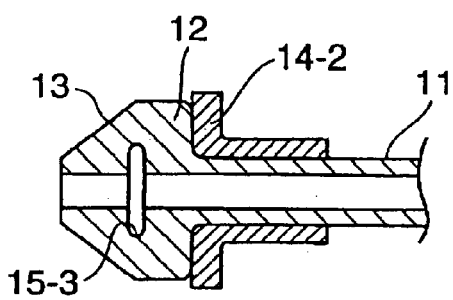
FIG. 7 is a longitudinal sectional view showing another example of a connecting head formed by a prior art forming method.
Figure 8:
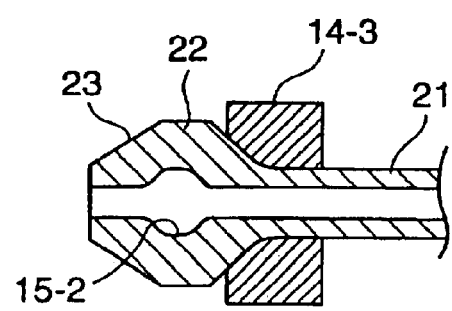
FIG. 8 is a longitudinal sectional view showing yet another example of a connecting head formed by a prior art forming method.

FIGS. 3 to 5 show examples of the connecting head of the high-pressure metal pipe which is obtained by the method described above in connection with FIG. 1. In the high-pressure metal pipe shown in FIG. 3, the sleeve washer 2b having an approximately cylindrical portion which covers the outer circumferential surface of the connecting head is fitted in advance onto and fixed to the thick-walled steel pipe 1 in the vicinity of the connecting head thereof with a head working section being left, and the outside circumferential surface of the end portion of the thick-walled steel pipe 1 is worked into the seat surface 4-2a having a truncated spherical shape corresponding to a mating seat, by the coaxial external pressure of a punch member of a forming apparatus, which punch number has the shape of the connecting head. Accordingly, the structure of the high-pressure metal pipe shown in FIG. 3 is such that the reduced-diameter connecting head 4-2 has in its inside the annular concave groove 5b whose contour shape has a shallow depth and a gentle cross section and such that the outer circumferential surface of the connecting head 4-2 is covered with the cylindrical portion of the sleeve washer 2b.

In the high-pressure metal pipe shown in FIG. 4, similarly to that shown in FIG. 3, the sleeve washer 2c having a cylindrical portion which covers the outer circumferential surface of the connecting head is fitted in advance onto and fixed to the thick-walled steel pipe 1 in the vicinity of the connecting head thereof with a head working section being left, and the outside circumferential surface of the end portion of the thick-walled steel pipe 1 is head worked into the seat surface 4-3a having a truncated spherical shape corresponding to a mating seat, by the coaxial external pressure of a punch member of a forming apparatus, which punch member has the shape of the connecting head. Accordingly, the structure of the high-pressure metal pipe shown in FIG. 4 is such that the reduced-diameter connecting head 4-3 has in its inside the annular concave groove 5c whose contour shape has a shallow depth and a gentle cross section and such that the outer circumferential surface of the connecting head 4-3 is covered with the cylindrical portion of the sleeve washer 2c so that the head-forming side end opening portion of the enlarged-diameter portion 2a-1 projects into the side of the seat surface 4-3a in the form of a small visor.

In the high-pressure metal pipe shown in FIG. 5, the sleeve washer 2d which has an approximately cylindrical portion to cover the outer circumferential surface of the connecting head and has at its rear end portion the sleeve 2d-1 to come into tight contact with the thick-walled steel pipe 1 is fitted in advance onto and fixed to the thick-walled steel pipe 1 in the vicinity of the connecting head thereof with a head working section being left, and the outside circumferential surface of the end portion of the thick-walled steel pipe 1 is worked into the seat surface 4-4a having a truncated spherical shape corresponding to a mating seat, by the coaxial external pressure of a punch member of a forming apparatus, which punch member has the shape of the connecting head. Accordingly, the structure of the high-pressure metal pipe shown in FIG. 5 is such that the reduced-diameter connecting head 4-4 has in its inside the annular concave groove 5e whose contour shape has a shallow depth and a gentle cross section and such that the outer circumferential surface of the connecting head 4-4 is covered with the cylindrical portion of the sleeve washer 2d.

As described above, in accordance with the high-pressure metal pipe having a connecting head according to the present invention as well as the method of forming the connecting head, since the connecting head can be reduced in diameter by the use of a sleeve washer having a cylindrical portion to cover the outer circumferential surface of the connecting head, it is possible to reduce the stroke and the external axial pressure of a punch member during the formation of the connecting head, whereby it is possible to reduce the output of a forming apparatus and hence the size thereof and it is possible to change the contour shape of an annular pocket or notch to be formed in the inside of the connecting head into a contour shape having a shallow depth and a gentle cross section. Accordingly, it is possible to solve the risk of cavitation erosion due to fluid pressure in the inside of the connecting head, and moreover, it is possible to achieve the superior advantage of greatly reducing the possibility that such a pocket or notch portion causes fatigue failure.

What is claimed is:

1. A high-pressure fuel injection pipe assembly, comprising:

a metal pipe having opposite first and second ends, a connecting head adjacent said first end, said connecting head having a seat surface flared outwardly from said first end, an outer cylindrical surface extending from said seat surface away from said first end and a bearing surface extending inwardly from an end of the outer cylindrical surface remote from the seat surface, said outer cylindrical surface having a selected outside diameter, a cylindrical body extending from said bearing surface of said connecting head toward said second end, said cylindrical body having an outside diameter less than said selected outside diameter of said outer cylindrical surface of said connecting head and in a range of approximately 4–20 mm, a passage extending centrally through said metal pipe from said first end to said second end, portions of said passage within said connecting head defining an annular groove spaced from said first end and aligned with portions of the connecting head having the cylindrical outer surface, portions of said metal pipe spaced from said connecting head defining a wall thickness of 1–8 mm, and a unitarily formed sleeve washer having opposite first and second ends, a first portion of said sleeve washer extending from said first end toward said second end thereof having a first cylindrical inner surface surrounding and closely engaging at least a portion of said cylindrical surface of said connecting head, a second portion of said sleeve washer extending from said second end thereof toward the first end having a second cylindrical inner surface surrounding and closely engaging portions of said cylindrical body adjacent said connecting head and an inner bearing surface extending between said first and second cylindrical inner surfaces and closely engaging the bearing surface of said connecting head, said sleeve washer further having a cylindrical outer surface facing oppositely from said first and second cylindrical inner surfaces and extending substantially from said first end of said sleeve washer to a location aligned with said second cylindrical inner surface of said sleeve washer, said first portion of said sleeve washer defining a first radial thickness and said second portion of said sleeve washer defining a second radial thickness, said second radial thickness being greater than said first radial thickness, and an annular outer bearing surface extending substantially orthogonally to said second cylindrical inner surface and facing second end of said sleeve washer.

2. The high-pressure pipe assembly of claim 1, wherein said seat surface comprises a conically generated surface.

3. The high-pressure pipe assembly of claim 1, wherein said seat surface comprises a spherically generated surface.

4. The high-pressure pipe assembly of claim 1, wherein said seat surface comprises a planar end face at said first end of said pipe and a flared surface extending outwardly from said planar end surface.

5. The high-pressure pipe assembly of claim 1, wherein the connecting head includes a radially aligned annular surface extending between said connecting head and said cylindrical body.

6. The high-pressure pipe assembly of claim 1, wherein the connecting head includes a conically generated surface extending between said connecting head and said cylindrical body.

7. The high-pressure pipe assembly of claim 1, wherein said passage has a first cylindrical portion between said annular groove and said first end and a second cylindrical portion extending from said annular groove toward said second end, said first and second cylindrical portions defining an inside diameter less than diameters of said passage at said annular groove, said annular groove comprising a smoothly concave toroidal surface at locations between said first and second cylindrical portions, and first and second inwardly convex toroidal surfaces smoothly extending respectively from said first and second cylindrical portions into said concave toroidal surface.

8. The high-pressure pipe assembly of claim 1, wherein said outside diameter of said cylindrical surface of said connecting head is between 10%–45% larger than said outside diameter of said cylindrical body.

9. The high pressure pipe assembly of claim 8, wherein said outside diameter of said cylindrical surface of said connecting head is between 12.5%–30% larger than said outside diameter of said cylindrical body.

10. The high-pressure pipe assembly of claim 9, wherein said outside diameter of said cylindrical surface of said connecting head is between 15%–20% larger than said outside diameter of said cylindrical body.

* * * * *

UNITED STATES PATENT AND TRADEMARK OFFICE
CERTIFICATE OF CORRECTION

PATENT NO. : 6,824,173 B2
DATED : November 30, 2004
INVENTOR(S) : Shoichiro Usui It is certified that error appears in the above-identified patent and that said Letters Patent is hereby corrected as shown below:

Title page,
Item [54], Title, should read:
-- HIGH-PRESSURE METAL PIPE HAVING CONNECTING HEAD AND METHOD OF FORMING THE CONNECTING HEAD AS WELL AS SLEEVE WASHER FOR THE CONNECTING HEAD --

Signed and Sealed this

Fifteenth Day of February, 2005

JON W. DUDAS
*Director of the United States Patent and Trademark Office*